United States Patent [19]

Mieno

[11] Patent Number: 4,660,318
[45] Date of Patent: Apr. 28, 1987

[54] ANGLER'S LURE WITH KEEL

[76] Inventor: James Mieno, 1624 Mount Pleasant, Northfield, Ill. 60093

[21] Appl. No.: 767,530

[22] Filed: Aug. 20, 1985

[51] Int. Cl.⁴ .............................................. A01K 85/00
[52] U.S. Cl. .................................. 43/42.39; 43/42.52
[58] Field of Search ................ 43/42.39, 42.29, 42.36, 43/42.52

[56] References Cited

U.S. PATENT DOCUMENTS

| | | | |
|---|---|---|---|
| 1,653,400 | 12/1927 | Jeffries | 43/42.39 |
| 1,709,010 | 4/1929 | Foss | 43/42.39 X |
| 2,586,186 | 2/1952 | Swanberg | 43/42.39 X |
| 2,605,574 | 8/1952 | Rolf | 43/42.39 |
| 2,659,175 | 11/1953 | Carpenter | 43/42.36 |
| 2,700,240 | 1/1955 | Gibbs | 43/42.52 X |
| 2,703,947 | 3/1955 | Petrasek et al. | 43/42.39 |
| 2,908,104 | 10/1959 | Hutchins et al. | 43/42.29 X |

FOREIGN PATENT DOCUMENTS

| | | | |
|---|---|---|---|
| 706602 | 3/1965 | Canada | 43/42.39 |
| 74953 | 4/1949 | Norway | 43/42.52 |
| 97020 | 9/1960 | Norway | 43/42.39 |

*Primary Examiner*—Nicholas P. Godici
*Assistant Examiner*—Carmine Cuda
*Attorney, Agent, or Firm*—Walter C. Ramm

[57] ABSTRACT

An angler's lure having a spinner-blade with fore and aft portions, and defining a fore-and-aft centerline; a keel depending from the aft portion of the spinner-blade; and, a hook anchored in the keel and extending upwardly and rearwardly, through a small hole in the spinner-blade, to form an angle of approximately 30° with the centerline. The keel is particularly characterized by a substantially planar front surface. The shank is adapted to carry a trailing artificial bait. When the lure, with trailing bait, is reeled in at a conventional rate through the waters of a fishery, weight/force/drag interactions, including transient imbalances, between water and lure—and, particularly, involving the front face of the keel—produce two pertinent effects: one is to urge the shank of the hook to a disposition normal to the surface of the waters and to stabilize the shank in that disposition; and, the other is to impart lively oscillatory or swimming-like movement to shank and bait. The shank of the hook may be bendable to enable weight/force/drag adjustments related to size and weight of the bait.

3 Claims, 3 Drawing Figures

ANGLER'S LURE WITH KEEL

BACKGROUND OF THE INVENTION

1. Field of the Invention

This invention relates to an angler's lure. The lure includes familiar spinner blade and hook elements, and particularly features a keel on the blade. When an artificial bait is fitted and the lure drawn through a body of water, dynamics between lure and water urge the shank of the hook toward a disposition normal to the water's surface and impart lively swimming motion to the bait.

2. Description of the Prior Art

The prior art includes U.S. Pat. Nos. 3,006,103, 3,352,052 and 4,414,772. The sinker of U.S. Pat. No. 3,006,103 and the lure of the present invention both involve center-to-gravity or distribution-of-weight considerations, but the respective structures differ markedly in that, at least, the sinker has no keel and the lure no resilient member. The U.S. Pat. No. 3,352,052 "fish lure" has a blade-like portion, but, again, nothing in the nature of a keel. Like the present invention, the U.S. Pat. No. 4,414,772 lure has a keel and features a trailing plastic dressing; however, that lure is a "top-water" device with positive buoyancy whereas the present invention is not only for surface fishing and is without provision for buoyancy.

SUMMARY OF THE INVENTION

To take increased numbers of fish is an objective of many anglers, and the present invention is in aid of that objective. The invention has particular utility with reference to fish species of the Greak Lakes and of many inland lakes and waters.

The invention includes the familiar sort of spinner-blade and and hook as comprise many types of angler's lures, and may also include an artificial bait. The blade is a metallic oval or disc-like structure, and the hook has a straight, somewhat bendable shank, a bend portion, and a barb. The bait may be fitted to the hook and trail behind the other parts of the lure.

A distinguishing feature of this invention is the keel which is attached to and depends downwardly from the rear or aft portion of the spinner-blade. The keel represents a substantial portion of the total weight of the lure and presents a generally forwardly-disposed or front planar surface. The end of the shank of the hook is fixedly carried in the keel.

In use, when the lure is reeled-in on the angler's line through water at a conventional rate, the keel tends to stabilize the lure in the attitude of use. Weight/force/drag dynamics between water and lure, and, in particular, the lure's planar front surface, urge the the hook toward a normal or parallel disposition relative to the water's surface—near the water's surface or at greater depth—and impart a swimming-like or oscillatory motion to the trailing bait.

DESCRIPTION OF THE PREFERRED EMBODIMENT

The drawings disclose a preferred embodiment of the lure of this invention.

Figure 1:
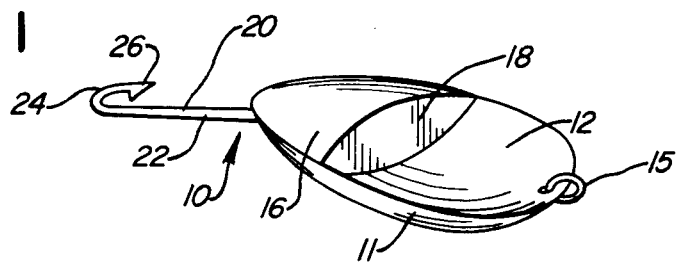
FIG. 1 illustrates underside of the lure. The keel appears, but, in this depiction, the lure is without a bait.

FIG. 1 depicts the underside of the lure. Reference numerals identify these parts; 10 is the entire blade/hook/keel assembly; 11 is the spinner-blade or "blade", 12 is the forward or "fore" portion of blade 11, 15 is a small split ring in the forward end of blade 11, 16 is the keel, 18 is the forward planar surface or "front" of keel 16, 20 is the hook, 22 is the shank of hook 20, 24 is the bend of hook 20, and 26 is the barb of hook 20. Blade 11 is a rigid metallic member and seen in FIG. 1 to be substantially symmetrical with reference to a fore-and-aft centerline or axis; it may be, for example, a Colorado- or Indiana-type spinner of a size ranging from #00 to #7.

Figure 2:
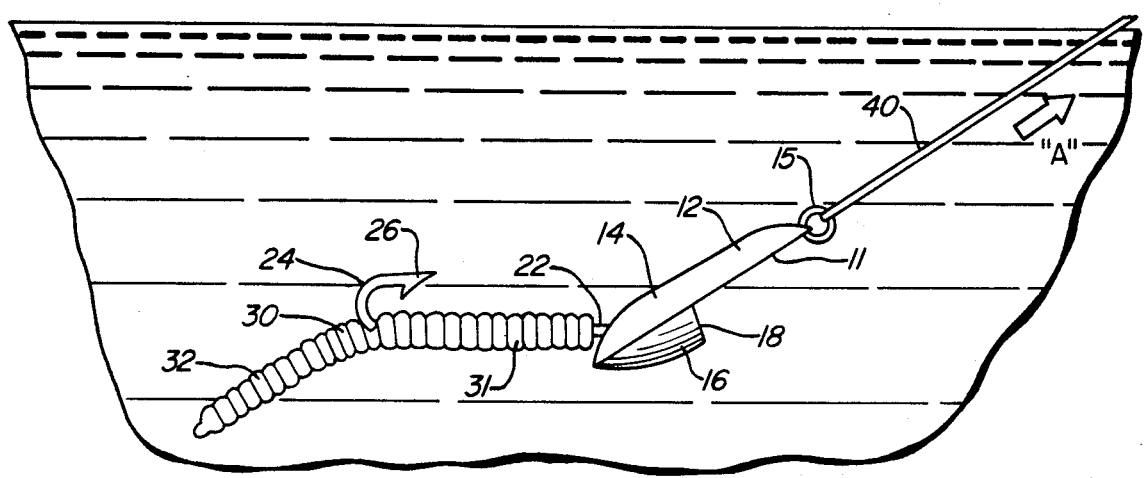
FIG. 2 shows the lure, in side view, in the attitude of use, including a trailing bait.

FIG. 2 shows a side view of the lure, submerged in a body of water and in an attitude of use; reference numeral 40 is an angler's line attached to ring 15, and 50 indicates the surface of the body of water. In addition to parts identified by the reference numerals of FIG. 1, in FIG. 2 numeral 14 is the rear or "aft" portion of blade 11; 30 is a bait element; 31 is a sleeve portion of bait 30, fitted to shank 22; and, 32 is the trailing portion of bait 30. Line 40 is being reeled inwardly—in the direction suggested by heavy arrow "A"—imparting movement to blade 10 towards the right in FIG. 2.

Figure 3:
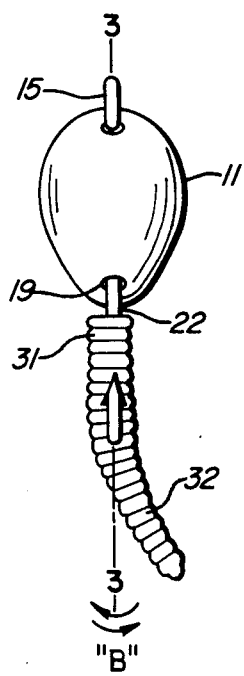
FIG. 3 is a plan view of the topside of the lure. This plan view also has the bait.

In FIG. 3—a plan view of the lure in FIG. 2—in addition to the parts identified by the reference numerals of FIGS. 1 and 2, numeral 19 is a small hole or aperture, drilled or otherwise formed, near the aft end of blade 10. Shank 22 passes through hole 19. Also, line 3—3 is the fore-and-aft centerline of blade 11, and, as suggested by arrows "B", the whole lure, including shank 22 and trailing portion 32, exhibits an oscillatory motion.

Hook 20 is a unitary rigid metallic structure, and shank 22 is, in some degree, bendable. One end of shank 22 is fixedly attached to or implanted in keel 16 to form an angle of between 20° and 40° between shank 22 and fore-and-aft centerline 3—3; a typical angular dimension in this connection is about 30°. Thus, as illustrated in FIG. 2, when the lure of this invention is in use, the weight of keel 16 tends to stabilize blade 10 with after portion 12 biased downwardly at the corresponding angle of about 30° relative to the surface of the body of water.

When the angler reels in line 40, as shown in FIG. 2, dynamic forces resulting from the movement of the relatively large-area planar keel-front 16 against the water—including many small and frequent imbalances—result in several distinct actions; blade 10 is biased toward the attitude of FIG. 2, and the dynamics ultimately resolve as oscillatory motion in the lure. Depending upon and to accommodate total weight of the lure and related dynamic effects—including the weight and drag of a structure such as trailing portion 32—the planar surface of keel-front 18 may be approximately perpendicular to centerline 3—3 or angularly displaced from such a perpendicular relationship. The oscillatory motion of trailing member 32, gives the lure semblance of a living creature.

The lure of this invention functions close to the surface of and at considerable depths within a body of water in the attitude of FIG. 2. Further, depending upon and within a wide range reel-in rates and line angles, it has a constant depth capability.

Bait 30 may be, for example, a plastic member with an elongate trailing portion 32 resembling a worm or a reptilian creature. Bait 30 may be made by conventional plastics-forming techniques. Sleeve 31 enables bait 30 to be fitted to shank 22 by being drawn over barb 26 and around bend 24. Thus, different sizes of portion 32 may be used with a single blade/keel/hook assembly 10.

Nevertheless, the size and weight of trailing portion 32 may figure importantly in the weight/force/drag effects attending use of the lure. With reference to blade/keel/hook assembly 10 having specific weight and configuration, a heavier or lengthier portion 32 may serve rearwardly to displace the center-of-gravity of the lure, or a relatively lighter or shorter portion 32, forwardly to displace such center. Such displacements might detract from optimum performance of the lure. To adjust for such possible displacements, a maker or user of the lure may bend shank 22 forwardly or to the rear. To permit such repetitive bending, the end of shank 22 is firmly anchored or emplanted in keel 16. Expectedly, the degree of bending from an original emplanted disposition of shank 22 need not exceed 10° either fore or aft.

Keel 16 is preferably made of lead or similar material. It can be separately molded and then attached to aft portion 14 of blade 11 by soldering or an equivalent technique, or it can be built up by soldering directly upon the underside aft portion 14. In any case two details require attention: planar front 18 must assuredly be formed on keel 16, and keel 16 must include provision for receiving and emplacing the end of shank 22. Where the keel is built up, such emplacement may be accomplished by allowing the material to flow—blade 11 and hook 20 being suitably held—around the end of shank 22 on the underside of blade 11 (after, as necessary, barb 26 and a portion of shank 22 have passed through hole 19).

A typical blade/keel/hook assembly 10 of this invention, where blade 11 is a #6 Indiana-type spinner-blade, is described and characterized in these approximate dimensions and parameters:

fore-and-aft length of blade 11—1 inch;
exposed length of shank 22—1½ inches;
emplaced depth, in keel 16, of shank 22—3/16 inch;
weight of keel—0.4 ounce;
shank 22 angled 30° from fore-and-aft axis of blade 11, and
planar front 18 angled rearwardly 15°.

Reeled in at a usual or customary rate, a lure of these dimensions and including a plastic bait whereof elongate trailing portion 32 is between 2 and 3 inches in length oscillates or wiggles in a lively and rapid manner through arcs of at least 50° at the rate of several oscillations per second.

The foregoing dimensions and parameters are exemplary, and assembly 10 may be embodied in a wide range of sizes, weights and configurations. Likewise, as noted, bait 30 may have a variety of weights and trailing lengths.

What is claimed is:

1. For a spinner-blade having a small aperture toward the rear thereof and being a lure for attachment to an angler's line, the improvement comprising a metallic keel-and-hook assembly whereof
   the keel
      is integrally bonded with and depends from the rear portion of the spinner-blade,
      presents a substantially planar front surface, and is by weight a substantial portion of the total weight of the lure; and,
   the hook
      is implanted in the keel and has a shank thereof disposed upwardly and rearwardly from the keel and said shank
      passes through the aperture;
   so that, when the lure is drawn on a line through the waters of a fishery, resultant forces tend to bias downwardly the rear portion of the spinner-blade and to impart oscillatory motion to the hook.

2. An angler's lure comprising
   a metallic blade defining a fore-and-aft-axis and having fore and aft portions and line-attachment means on the fore portion;
   a metallic keel, integrally joined with and depending from the aft portion of the blade, the keel representing by weight a substantial portion of the weight of the lure and presenting a substantially planar forwardly-disposed surface; and,
   a hook which comprises a shank, a bend and a barb, and is adapted to receive a portion of an artificial bait on the shank and thereby to carry the bait, and wherein
      an end of the shank is implanted in the keel,
      the shank, the bend and the barb extend rearwardly and upwardly from the keel, and
      the shank is of a size corresponding to the size of the received portion of the bait and forms an angle of approximately 30° from the axis of the blade.

3. The angler's lure of claim 2 wherein the blade has a small hole in its aft portion and along the blade's fore-and-aft axis, and the shank of the hook passes through the small hole in the blade and is repeatedly bendable in a fore-and-aft aspect to the extent of 10° from its initial position as part of the lure so that when the lure is provided with a trailing artificial bait, the shank portion of the hook is adjustable relative to the drag characteristics of the bait.

* * * * *